United States Patent Office 2,860,050
Patented Nov. 11, 1958

2,860,050

FEEDING OF POULTRY

Jesse W. Huff, Lansdale, and David K. Bosshardt, Broomall, Pa., assignors to Merck & Co., Inc., Rahway, N. J., a corporation of New Jersey No Drawing. Application April 3, 1956
Serial No. 575,702

4 Claims. (Cl. 99—4)

This invention relates to feed stuffs for poultry and also to a method of increasing the growth of poultry.

It is an object of the invention to provide the poultryman with a means of assuring the maximum growth of his poultry.

According to our invention, the growth rate of poultry is significantly increased by supplementing the daily feed intake of the poultry with a source of bromide ion, such as sodium bromide, added to the feed. The amount of material added to the feed is such that the final mixture contains from about four to about thirty parts of the added bromide ion in a million parts of the feed mixture. In other words, the addition of bromide ion is from about 4 to about 30 milligrams per kilogram of feed.

More specifically, we have found, using a purified poultry diet containing, in pure form, all the substances known as essential for growth of poultry, that the addition thereto of about eight parts per million of bromide ion significantly increases the weight gain of chickens living exclusively on this diet over a period of 31 days, starting not later than one or two days after hatching. We have also found that the addition of about 15 parts per million of bromide ion to the purified diet does not significantly increase the growth over that secured with 8 parts per million of bromide ion, but more importantly, is not deleterious to the chicken.

Some of the ingredients used in various commercial poultry feeds contain very small but detectable amounts of bromide ion. The methods used to determine whether any bromide ion is present in such a commercial poultry feed, and if so, the magnitude thereof, are tedious. It is thus expensive to make such determinations for any given poultry feed.

By our invention the poultryman or poultry feed manufacturer may incorporate a known quantity of bromide ion in the commercial poultry feed independently of the amount of bromide ion which may or may not inherently exist in the commercial feed materials that he uses, knowing that the amount of bromide ion which he adds will insure that at least the optimum quantity of bromide ion is present in the final feed consumed by the poultry, and that if there is some bromide ion originally present in one or more of the components of the commercial feed, no harm will be done to the poultry.

The following specific examples illustrate the growth promoting effect of the bromide ion when fed to young chickens.

EXAMPLE 1

A purified basal chick diet was prepared containing the ingredients set forth in the following table:

Table A
BASAL DIET

| Ingredient: | Amount in Total mixture, percent |
|---|---|
| Glucose (Cerelose, Corn Products Refining Co.) | 48.0 |
| Casein (Vitamin-test, General Biochemicals Inc.) | 18.0 |
| Gelatin | 10.0 |
| Salt mixture (Note 1) | 6.0 |
| Cellulose (Celluflour, Chicago Dietetic Supply Co.) | 5.0 |
| Soybean oil | 4.0 |
| Dextrin (white) | 3.0 |
| Calcium gluconate | 2.5 |
| Glycine | 2.0 |
| Choline methionine tartrate | 0.6 |
| L-Arginine | 0.5 |
| DL-methionine | 0.3 |
| Vitamin B mixture, see Note 2. | |
| Vitamins A, D, E and K, see Note 3. | |

Note 1.—*Salt mixture.*—This is a mixture of the following salts in the following amounts:

| Salt | Percent in mixture | Per 100 gm. of diet |
|---|---|---|
| NaCl | 13.9 | 0.83 gm. |
| $KH_2PO_4$ | 38.8 | 2.33 gm. |
| $MgSO_4$ | 5.7 | 0.34 gm. |
| $CaCO_3$ | 38.1 | 2.29 gm. |
| $FeSO_4.7H_2O$ | 2.7 | 0.16 gm. |
| KI | 0.079 | 4.7 mg. |
| $MnSO_4.2H_2O$ | 0.45 | 260.7 mg. |
| $ZnCl_2$ | 0.026 | 1.56 mg. |
| $CuSO_4.5H_2O$ | 0.047 | 2.86 mg. |
| $CoCl_2.6H_2O$ | 0.022 | 1.36 mg. |

Note 2.—*Vitamin B mixture.*—This mixture provides the following vitamins in the amount indicated for each 100 gms. of diet:

Vitamin: Per 100 gm. of diet, mg.
Thiamine hydrochloride _____ 2.0
Riboflavin _____ 2.0
Calcium pantothenate _____ 4.0
Niacin _____ 10.0
Pyridoxine hydrochloride _____ 2.0
Biotin _____ 0.04
Folic acid _____ 0.4
Vitamin $B_{12}$ _____ 0.01
Inositol _____ 100.0
Para-aminobenzoic acid _____ 30.0

Note 3.—*Mixture of vitamins A, D, E and K.*—This mixture, dissolved in some of the soybean oil of the purified diet, provides the following vitamins in the amount indicated for each 100 gms. of diet:

Vitamin: Per 100 gm. of diet, gm.
A and D concentrate containing—450,000 units of vitamin A per gm., 100,000 units of vitamin D per gm. _____ 25
α-Tocopherol acetate (vitamin E) _____ 20
Menadione (vitamin K) _____ 4

This vitamin mixture includes 200 gm. (for each 100 mg. of diet) of butylated hydroxyanisol (Tenox, Tennessee Eastman Corp.) serving as an antioxidant for the above vitamins.

It is evident that the foregoing purified chick diet contains all ingredients or factors known as essential for chick growth.

In the chick growth experiments one group of chicks, serving as the control, was fed the purified basal diet whereas a second group and a third group of chicks were fed the same basal diet to which had been added sodium bromide as a source of bromide ions, the second group having its diet supplemented by 8 p. p. m. of bromide ion, and the third group having its diet supplemented by 15 p. p. m. of bromide ion.

Thus, for supplementing 100 gms. of diet with 8 p. p. m. of bromide ion, there was added 0.8 milligram of bromide ion or 1.03 milligrams of sodium bromide. For supplementing 100 gms. of diet with 15 p. p. m. of bromide ion, there was added 1.5 milligrams of bromide ion, or 1.93 milligrams of sodium bromide. A suitable mixing procedure was used to insure a reasonably complete and uniform distribution of the bromide ion throughout the diet.

The chicks were New Hampshire Red-Silver Cornish cross strain of chicks. The chicks were secured from the hatchery right after they were hatched and placed on test promptly, so that the chicks, after hatching, received no food other than the one they received throughout the test. Each group consisted of 15 chicks, all cockerels, with the average weight of the chicks in each group about the same. The chicks were individually weighed and wing banded for identification at the beginning of the experiment.

After the chicks had been on test for 31 days (at which time the chicks were not over 32, or at most 33, days old), the chicks were individually weighed again and their average weight gain determined. The results are shown in the following table.

Table B

| Group: | Weight gain in 31 days, gms. |
|---|---|
| (1) Control; Chicks fed purified basal diet | 449 |
| (2) Chicks fed purified basal diet plus 8 p. p. m. of bromide ion | 487 |
| (3) Chicks fed purified basal diet plus 15 p. p. m. of bromide ion | 489 |

It is evident that the chicks fed the purified basal diet supplemented with bromide ion increased in weight significantly over the chicks which were fed the purified basal diet not so supplemented. It is also evident that the chicks fed the purified basal diet supplemented with 15 p. p. m. of bromide ion had about the same increase in weight as the chicks fed the purified basal diet supplemented with 8 p. p. m. of bromide ion. This indicates that about 8 p. p. m. of bromide ion supplementation of a purified basal diet is an optimum amount of supplementation. It also indicates that if the diet should contain unknown quantities of bromide ion up to the amount of about 7 p. p. m., the effect of adding the known amount of 8 p. p. m. of bromide ion thereto would not be deleterious to the chicks but would still produce about the optimum growth response.

EXAMPLE 2

In this test a group of 30 chicks (in two subgroups of 15 each) was used as the control group fed the purified basal diet (described in detail in Example 1), and a second group of 30 chicks (in two sub-groups of 15 each) was fed the same purified basal diet supplemented with 8 p. p. m. of bromide ion. The chicks were New Hampshire Red-Silver Cornish cross strain of chicks, as in Example 1, and the test procedures were the same as in Example 1. The results are shown in the following table:

Table C

| Group: | Weight gain in 31 days, gms. |
|---|---|
| Control; chicks fed purified basal diet | 447 |
| Chicks fed purified basal diet plus 8 p. p. m. of bromide ion | 487 |

EXAMPLE 3

In this test a group of 30 chicks (in two sub-groups of 15 each) was used as the control group fed the purified basal diet (described in detail in Example 1), and a second group of 30 chicks in two sub-groups of 15 each) was fed the same purified basal diet supplemented with 8 p. p. m. of bromide ion. The chicks were New Hampshire Red chicks. The test procedures were the same as in Example 1. The results are shown in the following table:

Table D

| Group: | Weight gain in 31 days, gms. |
|---|---|
| Control; chicks fed purified basal diet | 480 |
| Chicks fed purified basal diet plus 8 p. p. m. of bromide ion | 535 |

While sodium bromide is described in the above examples as the compound added to the diet to provide the bromide ion, other non-toxic bromide ion forming compounds may be used, such as potassium bromide or ammonium bromide.

What is claimed is:

1. A process for improving the poultry growth promoting ability of a poultry feed which comprises adding thereto a compound serving as a source of bromide ion, the amount of such compound added being of the order which adds from about 4 to about 30 parts of bromide ion to a million parts of the feed.

2. A process for improving the poultry growth promoting ability of a poultry feed which comprises adding thereto a substantially pure substance of the group consisting of sodium bromide, potassium bromide and ammonium bromide.

3. The process as described in claim 2 in which the amount of the substance added is that which adds from about 4 to about 30 parts of bromide ion to a million parts of the feed.

4. A method for assuring the maximum growth promoting potential of a poultry feed which comprises mixing therewith about 10 milligrams of sodium bromide per kilo of feed.

References Cited in the file of this patent

Harwood et al.: J. A. V. M. A., September 1940, vol. 97, pages 248-253.